United States Patent [19]

Wilson et al.

[11] Patent Number: 4,953,338
[45] Date of Patent: Sep. 4, 1990

[54] SCREEN ASSEMBLY

[75] Inventors: Mervyn Wilson, Kettering; Martin Gibbons, Weybridge, both of England; Simon Perutz, Evanston, Ill.

[73] Assignee: Nimlok Limited, England

[21] Appl. No.: 370,605

[22] Filed: Jun. 23, 1989

Related U.S. Application Data

[63] Continuation of Ser. No. 76,489, Jul. 22, 1987, abandoned.

[51] Int. Cl.$^5$ .............................................. A47B 5/00
[52] U.S. Cl. ...................................... 52/586; 160/135
[58] Field of Search .................... 52/36, 239, 456, 586; 160/135, 229.1

[56] References Cited

U.S. PATENT DOCUMENTS

| | | | |
|---|---|---|---|
| 1,723,306 | 8/1929 | Sipe | 52/586 X |
| 3,605,851 | 9/1971 | Miles | 160/351 X |
| 3,852,901 | 12/1974 | Woodle | 52/586 X |
| 4,021,973 | 5/1977 | Hegg | 52/36 |
| 4,103,465 | 8/1978 | McDonald | 52/127 |
| 4,129,163 | 12/1978 | Johnson | 160/135 |
| 4,147,198 | 4/1979 | Ytter | 160/135 |
| 4,637,178 | 1/1927 | Nimmo | 52/36 |

FOREIGN PATENT DOCUMENTS

| | | |
|---|---|---|
| 1270242 | 5/1972 | United Kingdom . |
| 1468433 | 3/1977 | United Kingdom . |

Primary Examiner—Carl D. Friedman
Assistant Examiner—Jerrold D. Johnson
Attorney, Agent, or Firm—Neuman, Williams, Anderson & Olson

[57] ABSTRACT

A display assembly (FIG. 1) comprises a plurality of panels (1) joined together by elongate connecting members (2, 3). Each panel has a removable frame formed by extrusions (6) in each of which is a slot (13) having a restricted entrance (FIG. 2). Each connecting member (2, 3) has two heads (18) which can be slid into slots (13) in adjacent panels (1), from one end, to join the panels together, each head being too wide to pass through the restricted entrance of the slot. A central body portion (20) of the connecting member, to which the heads (18) are joined, is positioned between, and extends outwards between, adjacent panels to facilitate access to the connecting member and enable the screen assembly to be dismantled easily. A longitudinal slot (50), (FIGS. 21 to 23), can be provided in a part of the body (20) that is accessible between connected panels, to enable components such as shelf-supporting brackets to be secured to the screen assembly. To increase the versatility of the assembly, a variety of connecting member (FIGS. 4 to 12) can be provided, enabling panels to be joined together in a common plane or in planes inclined to one another and in one or more tiers, and the assembly can also include panels connected together by poles (34) and clips (35) (FIG. 16). The connecting members (2, 3) can be extended components and may be of hollow cylindrical construction (FIGS. 10 and 11).

3 Claims, 8 Drawing Sheets

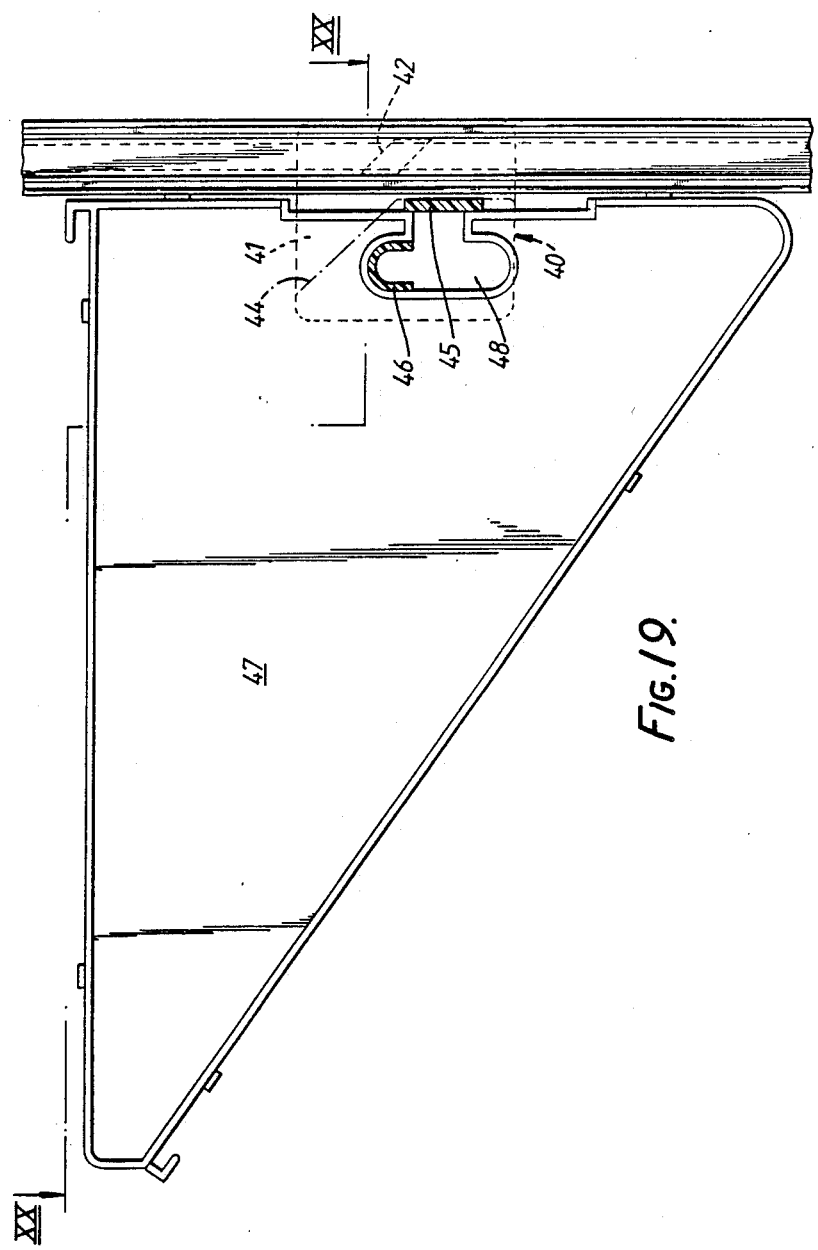

SCREEN ASSEMBLY

CROSS REFERENCE TO RELATED APPLICATIONS

This is a continuation of application Ser. No. 07/076,489 filed July 22, 1987 now abandoned the text of which is hereby incorporated by reference.

This invention relates to a portable display system, having a plurality of panels which are detachably connected together.

British Patent Specification No. 1 270 242 describes a display system employing an aluminum clip which is used to fasten a panel to an upright pole. In the arrangement shown in the specification the clip is fastened to the panel edge by means of a screw passing through a hole in its base, and to the pole by the snapping of a resilient arcuate portion of the clip around the pole. In a commercial embodiment of the arrangement the aluminum clip is fastened in a slot in the panel edge.

British Patent Specification No. 2 126 309 describes a display system employing a plastics clip which is used to fasten a panel to an upright pole. In this case the clip is secured in a slot in the panel edge and fastened to the pole by the snapping of a resilient arcuate portion of the clip around the pole.

While the panel, pole and clip arrangements referred to above are entirely satisfactory for many purposes, it would be desirable sometimes, but not always, to have a simpler, if somewhat less versatile, method of fastening panels to one another. With the systems described above, panels can only be fastened together through the intermediary of clips and poles.

Various other display systems exist that each have different types of fastenings, but a problem arises in constructing and dismantling such assemblies quickly and easily. For example, U.S. Pat. Specification No. 4,103,465 describes a display system comprising panels which, on their vertical sides, have keyways into which connectors can be slid to hold the panels together. While such a system has the advantage of being comparatively simple, it does not allow ready access to the connectors once they have been located in the keyways and this can give rise to problems when the system is being dismantled.

Other types of fastenings often suffer from the disadvantage that they affect the overall visual appearance of the screen assembly and spoil its clean lines.

It is also known to provide screen assemblies comprising a plurality of panels hingedly connected together. Such assemblies have the advantage that they are very simple and easy to erect since little more is involved than simply unfolding the panels. On the other hand the assembly is not very versatile.

Outside the field of portable display systems, the use of panels and connecting members in partitioning systems for buildings has also been described, for example in French Patent Specification No. 2 032 185. However, although such systems are often designed so that they can be dismantled, they are not required to meet the same standards of portability, simplicity and versatility as display systems. The panels of such systems, each comprising a screen (usually of laminar construction) and a frame are commonly prefabricated and are required to meet constructional standards of, for example, robustness and sound-and fire-proofing. In a display system, on the other hand, although robustness is of importance, features such as visual attractiveness are also of particular importance, as is the possibility of readily being able to alter the appearance, size and, even, construction of the screens. For this reason, techniques employed in partitioning systems for the construction industry have not conventionally been applied to portable display systems.

It is an object of the invention to provide a portable display system which is quick and easy to erect and to dismantle and yet is reasonably versatile.

According to one aspect of the invention a portable display system comprises a plurality of display panels and at least one elongate connecting member to connect the panels together, each panel comprising at least one screen member and at least one frame member which provides a channel in which an edge of the screen member is received and also provides an outwardly-facing slot in an edge of the panel, each slot comprising an interior portion and a restricted outer entrance portion which is defined by inwardly-projecting lips on the panel, the connecting member having a uniform cross-section with at least two slot engaging heads, each head having a width greater than the width of the entrance portion, in which the heads of the connecting member can be inserted into the ends of slots in respective panels that are to be connected together and slid along the slots thereby coupling the edges of the panels together, the heads of the connecting member being unable to pass through the entrance portions of the slots, characterized in that the connecting member has a body portion to which the slot engaging heads are joined, the body portion having a width greater than the width of the entrance portions of the slots so that it will extend outwards between adjacent panels connected together by the connecting member.

Preferably, each screen member is removable from its frame member(s).

A display system of this kind can be erected very quickly and easily and yet is not limited to any particular number or arrangement of panels. In the erected system, the connecting members are accessible because the body portions of the members extend outwards between the panels and the assembly can, consequently, also be dismantled comparatively easily.

To facilitate the connection of further components, for example shelves, to the display system, a longitudinally extending further slot may be formed in the body portion of the connecting member in such a position that the entrance of the further slot will be located between adjacent panels connected together by the connecting member. A component to be connected to the display system can then be secured in the further slot.

Advantageously, the interengagement of a slot engaging head of a connecting member with a panel slot is such that substantially the only relative movement that can occur between them is longitudinal sliding movement. In this way the panels are held in substantially fixed relationship relative to one another with little or no play between adjacent panel edges that are connected together.

The body portion may extend outwards to fill, substantially, the gap between the said adjacent panels.

The connecting member may be an extruded component. In an embodiment of the invention, the connecting member is of hollow cylindrical construction, the wall of the cylinder being shaped to form the slot engaging heads.

Preferably, each panel slot extends along substantially the whole length of the edge of the panel in which it is formed. The connecting member may be arranged to connect panels together in a common plane or in planes inclined to one another. In the latter case, in a preferred embodiment of the display system, the angle between the connected panels may be 150°, 135°, 120°, 90° or 60°. In this way a versatile, free standing display system may be constructed and dismantled quickly and easily.

The versatility of the system is improved when a respective frame member is provided along each edge of the panels. To form a secure border for a panel, the adjoining ends of the frame members of that panel may be connected by an angled bracket, which preferably is fixed to interior walls of the frame members. In one embodiment the frame members are aluminum extrusions.

The screen member of a panel may form part at least of a face of the panel. In one form of the invention, each panel comprises a single screen member only. In another form of the invention, each panel comprises two spaced-apart screen members each providing substantially the whole of a respective face of the panel and each frame member provides two channels, each of which channels receives an edge of a respective one of the screen members.

The or each screen member may overlap the longitudinal side walls of the slot in the panel. To this end, the channel may be defined, at least partly, by the longitudinal side walls of the slot in the frame member. Thus a panel may be made so that if one extrusion is removed the rest of the border is left in place, and the screen member may then be replaced without further dismantling of the panel.

In an advantageous embodiment of the invention wherein a plurality of connecting members are provided, the connecting members are of various lengths. The connecting members may include a connecting member of length approximately equal to the length of a side of a panel to be connected and a connecting member of length approximately equal to half the length of a side of a panel to be connected.

Preferably, at least in the case of an assembly comprising a plurality of tiers of panels, one head of a connecting member is located partly in the slot in one edge of a first panel and partly in the slot in one edge of a second panel. In this way a more sturdy assembly may be constructed.

The present invention accordingly also provides a screen assembly comprising at least three panels and at east one elongate connecting member to connect the panels together, the connecting member having at least two panel engaging portions which can engage with respective panels to connect them together, in which one panel engaging portion of one connecting member partly engages two of the panels and the other panel engaging portion of the connecting member at least partly engages the third panel, characterized in that each panel engaging portion comprises a head engageable in a slot in an edge of the respective panel, the slot and the head being so dimensioned that the head can be slid freely along the slot. Such a screen assembly may have at least four panels, the other head of the connecting member being located at least partly in the slot in one edge of the fourth panel.

According to a further aspect of the invention there is provided apparatus for constructing portable display system, the apparatus comprising a plurality of panels each with a slot in at least one edge thereof, a plurality of elongate connecting members for connecting the panels together, each connecting member having at least two slot engaging heads which can be inserted into the slots in respective panels to connect them together, a plurality of poles and a plurality of fastening elements having foot portions fastenable to the slots in the panels and arcuate portions fastenable around the poles, whereby panels may be connected together either by said elongate members or by said fastening elements and poles. An arrangement of this kind enables a display system to be constructed using a mixture of two assembly techniques and thus provides a particularly versatile arrangement.

The arrangement may include further fastening elements having foot portions fastenable to the slots in the panels and supporting portions by which additional components may be mounted on the screen assembly. The supporting portions may, for example, be in the form of shelf supporting brackets.

In a preferred form of this arrangement, the fastening elements (either with arcuate portions or with supporting portions) may be securable in the slots by rotation, the slot engaging heads of the connecting members being freely slidable in the slots.

Advantageously, at least one of the connecting members is formed with a longitudinally-extending further slot in such a position that the entrance of the further slot will be located between adjacent panels connected together by the connecting member; the apparatus further including at least one fastening element which is securable in the further slot, by which an additional component may be mounted on the screen assembly.

An alternative apparatus, provided by the present invention, for constructing a portable display system, comprises a plurality of panels each with a slot in at least one edge thereof, and a plurality of connecting members for connecting the panels together, each connecting member having at least two slot engaging heads which can be inserted into the slots in respective panels to connect them together, some of the connecting members being arranged to connect panels together in a common plane and others being arranged to connect panels together in planes inclined to one another, some of the connecting members being of one length and others being of another length. An arrangement of this type enables a display system to be constructed, in which panels lie in different planes and also in tiers which are not necessarily all of the same height.

The present invention further provides a portable display system comprising a plurality of panels each with a slot in at least one edge thereof, the slot having a longitudinally-extending restricted entrance, and at least one elongate connecting member of hollow cylindrical construction to connect the panels together, the wall of the cylinder being shaped to form at least two slot-engaging heads which can be inserted into the ends of slots in respective panels and slid along the slots, each head being unable to pass through the restricted entrance of the respective slot, wherein the wall of the cylinder is also shaped to provide a longitudinally-extending further slot in the connecting member, in such a position that the entrance of the further slot will be located between adjacent panels connected together by the connecting member.

The present invention also provides a connecting member suitable for connecting together the panels of a display system as defined above, the connecting member being elongate, having a uniform cross-section and including at least two heads for engaging respective slots in edges of the panels to be connected together and a central body to which the heads are connected by necks, each neck being defined by recesses arranged to receive projecting lips forming an entrance of a respective one of the slots, and the body having a width greater than the slot entrance so that it will extend outwardly between adjacent panels connected by the connector; there being a longitudinally-extending further slot in an outwardly-extending part of the body portion in such a position that the entrance of the further slot will be located between adjacent panels connected together by the connecting member. With this form of connecting member the joints between adjacent panels can have very clean lines enhancing the overall appearance of the display system, while it is also possible (through the use of the further slot) to connect additional components, for example shelves, to the system.

By way of example various embodiments of the invention will now be described with reference to the accompanying drawings of which:

Figure 3:
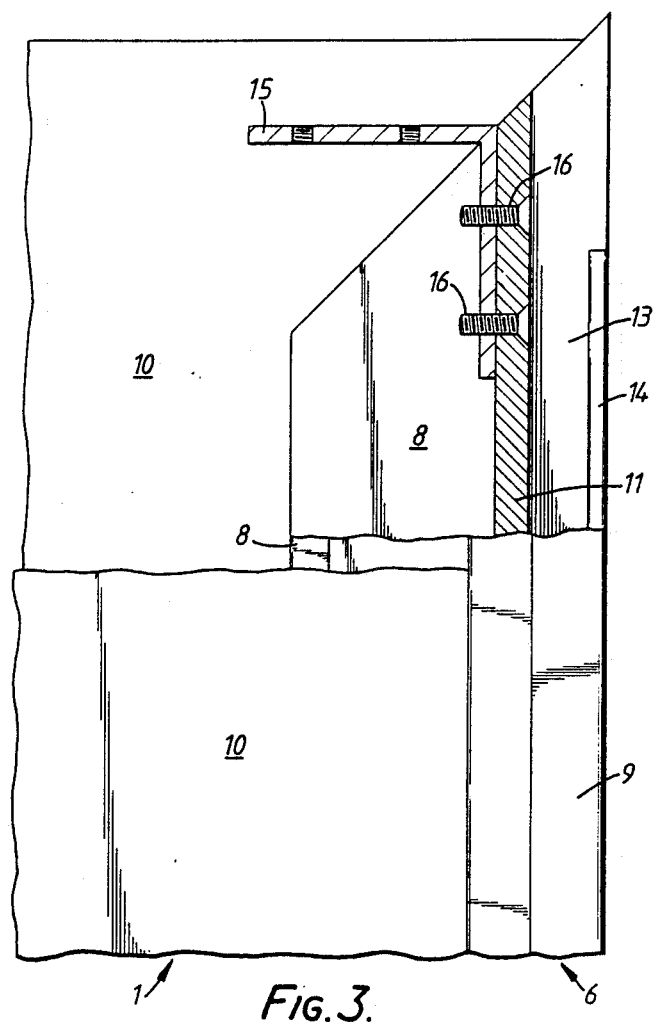
Figure 8:
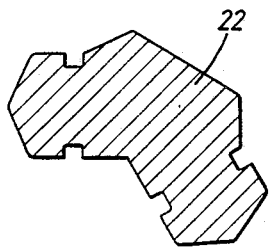
Figure 9:
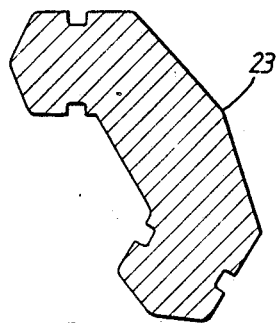
Figure 10:
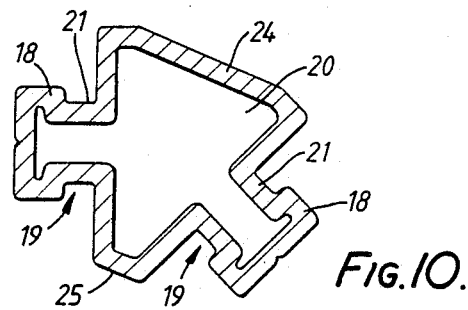
Figure 11:
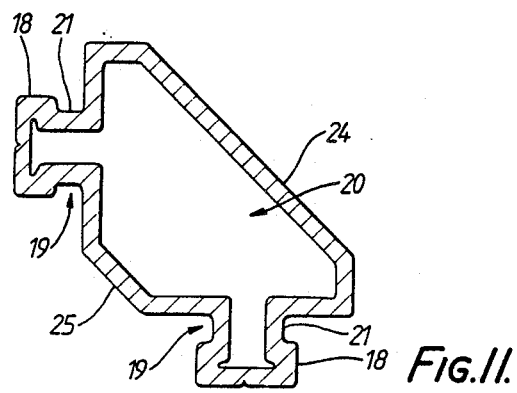
Figure 12:
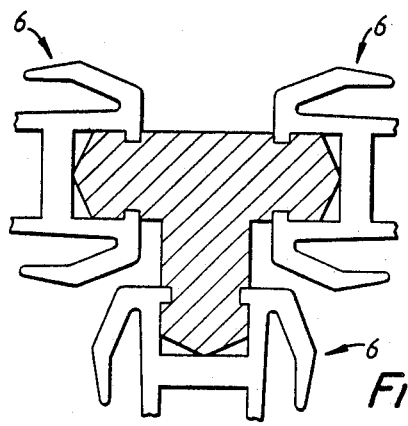
Figure 13:
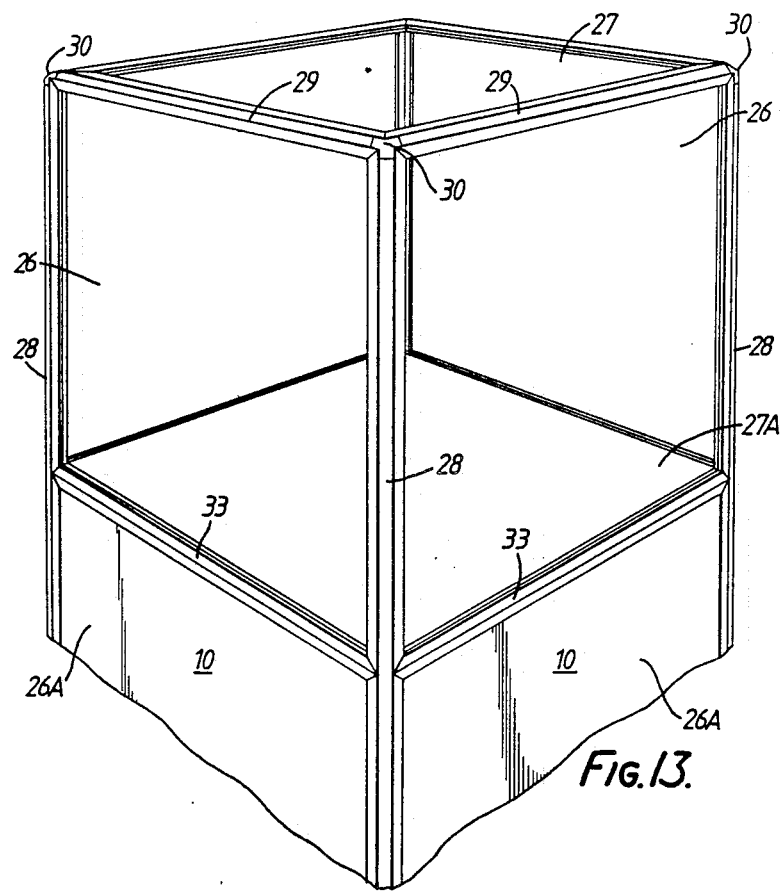
Figure 14:
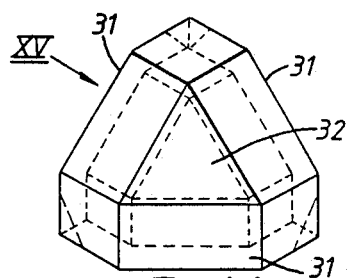
Figure 15:
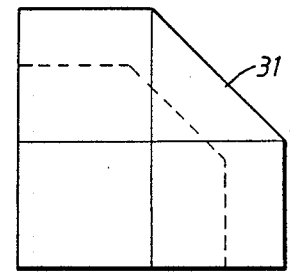
Figure 18:
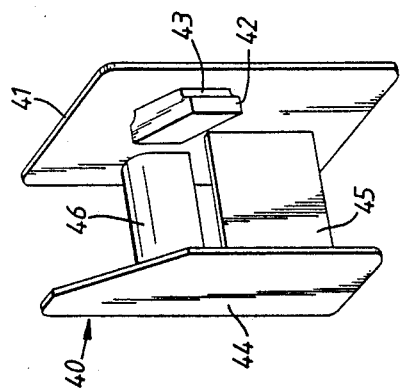
Figure 17:
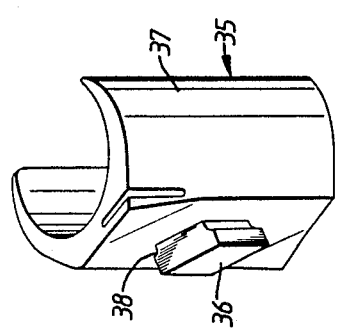
Figure 16:
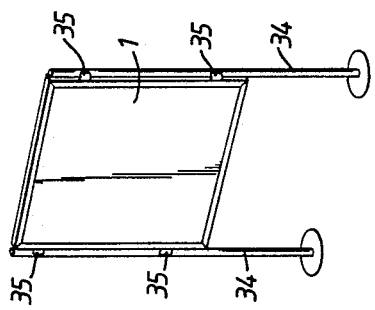
Figure 20:
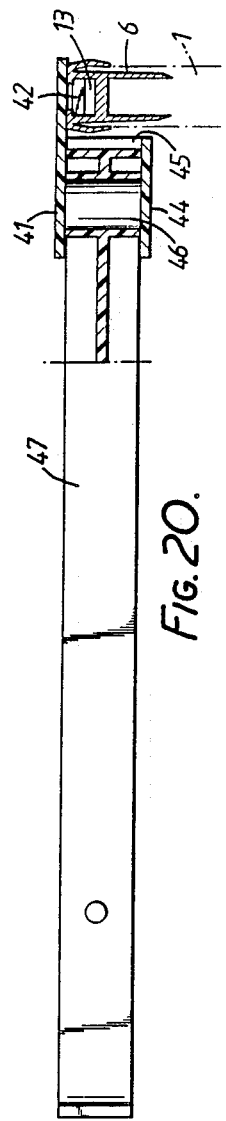
Figure 21:
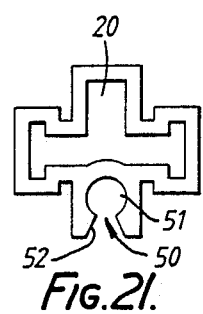
Figure 24:
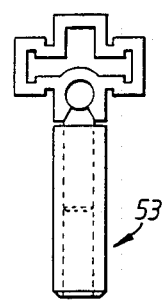
Figure 25:
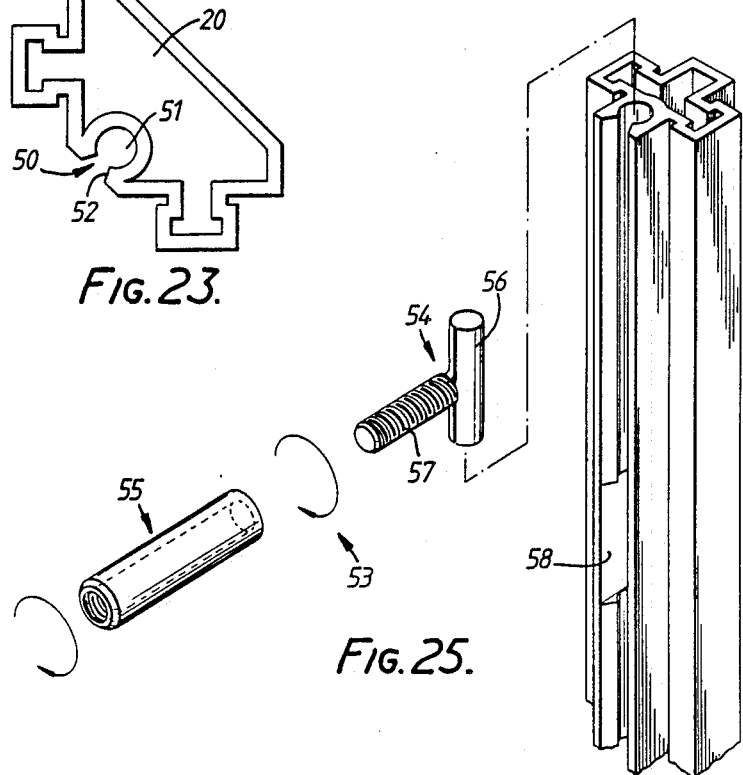

FIG. 3 is a detailed view of part of one of the panels of the screen assembly of FIG. 1, FIGS. 4 to 9 are views of the cross-sections of respective forms of the connecting member, FIGS. 10 and 11 are views of the cross-sections of other forms of connecting member, FIG. 12 is a view of the cross-section of another form of connecting member, FIG. 13 is a perspective view of another screen assembly, FIG. 14 is an isomeric view of a component of the assembly of 13, FIG. 15 is a view from one side of the component shown in FIG. 14 in the direction of the arrow XV, FIG. 16 is a perspective view of a known screen assembly, FIG. 17 is a perspective view of a component known of the assembly of FIG. 16, FIG. 18 is a perspective view of another component known for use with a screen assembly, FIG. 19 is a side view showing the component known of FIG. 18 in use, FIG. 20 is a view on the line XX—XX of FIG. 19, FIGS. 21 to 23 are views of the cross-sections of other forms of connecting members, FIG. 24 is similar to FIG. 21 but shows a fastening device secured to the connecting member, and FIG. 25 is an exploded perspective view of the components shown in FIG. 24.

Figure 1:
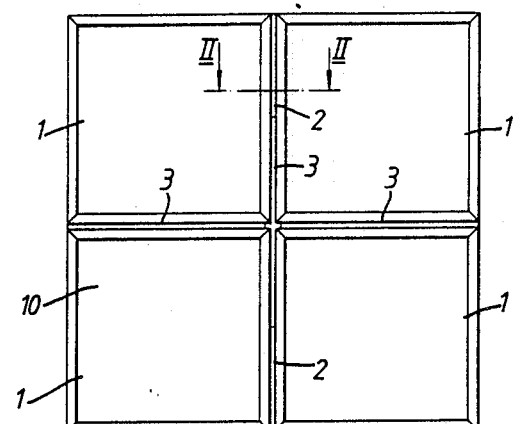
FIG. 1 is a front elevation of a screen assembly.

The screen assembly shown in FIG. 1 comprises four panels 1, joined together by connecting members 2, 3.

Figure 2:
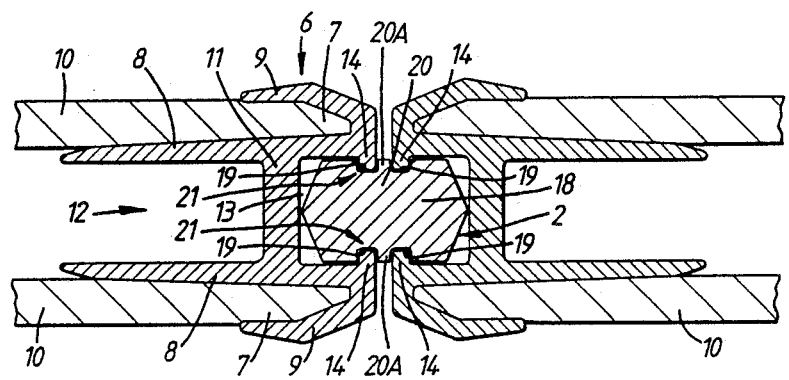
FIG. 2 is a view along the line II—II of FIG. 1.

Referring now also to FIGS. 2 and 3, each panel comprises a pair of parallel display screens 10 located at each of their four edges by respective aluminum extrusions 6 which provide a rigid frame for the panel and whose cross-sectional shape is shown most clearly in FIG. 2. Each extrusion 6 has channels 7 which are defined between walls 8 and fins 9 of the extrusion and in which the edges of the screens 10 are received. The walls 8 of each extrusion are joined by a longitudinal back wall 11 which, together with the walls 8, defines an inner slot 12 and an outer slot 13. The outer slot 13 is T-shaped, the stem of the "T" forming a restricted outer entrance portion of the slot and being defined by inwardly projecting lips 14 of the extrusion 6 (except at the ends of the extrusions where the lips are cut away to allow access to the slots 13 in extrusions bordering adjacent edges of the panels) and the bar of the "T" defining an interior portion of the slot having longitudinal side walls connected by the back wall 11. The ends of the extrusions 6 are joined by a right-angled bracket 15, located in the inner slot 12 and attached to the extrusion by screws 16, inserted from the outer slot 13 through holes in the back walls 11 of the extrusions. Removal of any one of the extrusions by unfastening its screws 16 allows either or both of the screens 10 to be changed by sliding them out of the channels 7.

Referring to FIG. 2, the connecting member 2, which has a uniform cross-section throughout its length and may be formed by extrusion and cut to length, comprises two heads 18 to engage the slots 13 in the panels 1, each head fitting with clearance in the interior portion of the respective slot but having a width greater than the separation of the lips 14 so that it will not pass through the entrance portion of the slot. The heads 18 of the connecting member have pointed ends and are joined to a central body 20 by necks 21, thereby defining recesses 19 which accommodate the lips 14. Because the width of the body 20 is greater than the width of the restricted outer entrance portions of the slots 13, as can be seen from FIG. 2, the body extends (at 20A) between the extrusions 6 of the adjacent panels. In order to attach the connecting member 2 to a panel 1, one of the heads 18 of the connecting member 2 is inserted into one end of the slot and then slid along the slot until the whole of the head is located within the slot; in order to enable the head 18 to be inserted into the end of the slot 13, the lips 14 are cut away at the ends of the slot. In the more common case where the connecting member 2 is to be engaged with two panels at once, the panels are brought into the position shown in FIG. 2 and then the two heads 18 of the connecting member 2 are inserted into the slots 13 of the panels. The connecting member 2 is freely slidable longitudinally in the slots 13 and, because of the engagement of the lips 14 in the recesses 19 of the connecting member and the location of the projecting body portions 20A between the panels, this is substantially the only relative movement that can occur between the connecting member and the panels.

In the particular arrangement shown in FIG. 1, two tiers of panels are connected together. In such a case it is advantageous for the connecting member to extend across the junction of the upper and lower tiers of panels. Accordingly, two lengths of connecting members are provided: one, which is referenced 2 in the drawings, is about half the length of a panel side and the other, which is referenced 3 in the drawings, is almost the same length as a panel side. The members 2 and 3 are identical apart from their length. In the arrangement shown in FIG. 1 the side edges of the panels 1 are joined together by a pair of connecting members 2 between which a member 3 is provided. The top edges of the lower tier of panels are joined to the bottom edges of the upper tier by a pair of connecting members 3. The connecting members 2, 3 are slidably located in the panel edges and the lower vertical connecting member 2 is held in position simply by the floor on which it rests. The connecting members between the top edges of the lower tier of panels and the bottom edges of the upper tier of panels may be omitted if desired.

Figure 4:
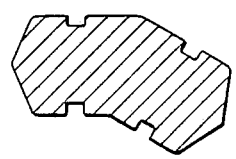
Figure 5:
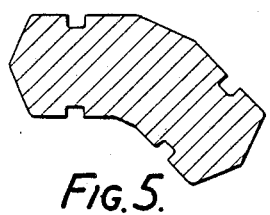
Figure 6:
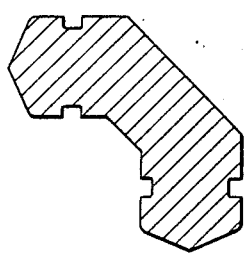
Figure 7:
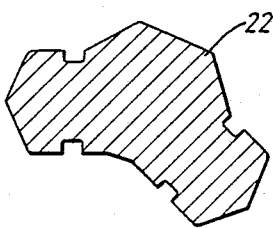

The connecting members 2, 3 are suitable for connecting panels together in a common plane. FIGS. 4 to 9 show connecting members of the same type but of different cross sections, which may be used to connect two panels together with an angle between them. The connectors shown in FIGS. 4 to 6 provide angles, between the connected panels, of 150°, 135° and 90° respectively. The connector shown in FIG. 7 also provides an angle, between connected panels, of 135° but in this case the back 22 of the connector is extended so that it will project to a greater extent between the extrusions 6 of the connected panels and provide a smoother line across the gap between the panels. FIG. 8 shows a connector with a similarly-extended back 22 but, in this case, the connector provides an angle of 120° between connected panels. FIG. 9 shows a connector which provides an angle of only 60° between panels and although, in this case, the back of the connector is not extended as in FIGS. 7 and 8 it is contoured at 23 to follow the line of the panels.

Another type of connector is illustrated in FIGS. 10 and 11. This type of connector has the same external features as the connectors shown in FIGS. 4 to 9 that is, two slot-engaging heads 18 which are joined to a central body 20 by necks 21 which define recesses 19 which accommodate the lips 14 of the panel extrusions 6. In this case, however, the connectors are extruded components of hollow cylindrical construction, the wall of the cylinder being shaped to form the required external features. The connector shown in FIG. 10 will provide an angle, between panels, of 135° while that shown in FIG. 11 will provide an angle of 90°. The slot engaging heads 18 of these connectors are not pointed as in FIGS. 4 to 9 but are of rectangular cross-section similar to, but smaller than, the interior portion of the slots 13 in the panel extrusions 6. In addition, the back and front portions 24, 25 of the central body 20 of each connector are extended in such a way that they will completely fill the respective gaps between the adjacent extrusions 6 of the connected panels.

A screen assembly having a plurality of panels and variety of connecting members may thus be assembled simply and quickly. The finished assembly has a clean outline either with simple recesses visible between adjacent panels or, if desired, with the gaps between panels filled by the central bodies of the connecting members.

The screens 10 may be made of board or a similar material and may be provided with a flocked surface. The screens 10 are each reversible and different surfaces and/or different colours of surface may be provided on opposite sides of the boards. If only one side of the screen assembly is to be viewed then the rear screen 10 may be omitted. Instead of providing two screens 10 a single thick screen element may be provided, the edges of this element being received in the inner slot 12 of the extrusions 6 instead of the channels 7. In this case, the frame members 6 need not have the shape shown in FIG. 2.

Other forms of connecting member may be used for joining panels in different configurations and, in particular, for joining more than two panels. For example, by placing two of the connecting members shown in FIG. 6 back to back and securing them together, for example by welding, it is possible to join together four panels at right angles to one another. Such a connector could be extruded in a single piece if preferred. FIG. 12 shows a connector, extruded in a single piece, for use in joining three panels together (only the panel extrusions 6 being shown). Two of the panels lie in a common plane and the third panel is in a plane at right angles to them.

While in the arrangement shown in FIG. 1 four panels are connected together in two tiers it will be appreciated that this is only one of many possible arrangements that can be constructed using a screen assembly as described above. FIG. 13, for example, shows a display case comprising a horizontal top panel 27 and four vertical sides each composed of two panels 26, 26A one above the other. The upper panel 26 of each side is transparent, as is the top panel 27, and the lower panel 26A of each side is opaque. The transparent upper part of the display case has a floor formed by an opaque horizontal panel 27A on which an object to be displayed can be positioned. The vertical panels 26, 26A of adjacent sides are connected together by vertical connecting members 28 which extend the complete height of the display case and which may be of the type shown in FIG. 6 or FIG. 11, and each side is connected to the horizontal top panel 27 by a horizontal connecting member 29 which may also be of the type shown in FIG. 6 or FIG. 11. The two vertical panels 26, 26A of each side and the horizontal floor panel 27A are connected together by a horizontal "three-panel" connecting member 33 which may be of the type shown in FIG. 12. At each corner of the top panel 27 a corner piece 30 is provided to maintain a clean outline at the junction between the various connecting members 28, 29. This corner piece 30, which is shown in greater detail in FIGS. 14 and 15, has three sides 31 and a central triangular portion 32. Each of the sides 31 is similar in shape to the connecting members 28, 29, as can be seen by comparing the side view (FIG. 15) with FIG. 6, so that each side 31 can be fitted into a respective end of the slots 13 of two connected panels, adjacent the end of the connecting member. The corners of the corner piece 30 can be cut-away as indicated by the dotted lines in FIG. 14 to enable the piece to be inserted more easily in the ends of the panel extrusions 6. When in position, the triangular portion 32 of the corner piece is visible.

While the panels shown in FIGS. 1 and 13 are square and all the same size, other shapes of panel may be employed and panels of different sizes connected together.

The panels shown in the drawings are substantially the same as those shown in British Patent Specification No. 2 126 309 referred to above, the description of which is incorporated herein by reference. Briefly, British patent Specification No. 2 126 309 describes a screen assembly of the type shown in FIG. 16, comprising at least one panel 1 and two upright poles 34 to which the panel is fastened. The panel 1 is substantially the same as those shown in FIG. 1 and it is fastened to the poles 34 by clips 35 one of which is shown in FIG. 17. Each clip 35 has a foot portion 36 and an arcuate portion 37 to which the foot portion is connected by a neck 38. The foot portion 36 can be inserted into the end of the slot 13 (FIG. 2) in one side of the panel and slid along the slot to the desired location, the neck 38 of the clip being located between the lips 14 of the panel extrusion 6. The clip 35 is then rotated, whereupon the foot portion 36 becomes progressively more securely clamped in the slot 13 and, finally, is locked to the panel. The arcuate portion 37 of the clip can then be snapped onto the pole 34.

Because the panels 1 of the screen assemblies shown in FIGS. 1 and 16 are of similar construction, it is possible to construct a screen assembly in which certain panel edges are joined together by slide connecting members of the kind shown in FIGS. 2 and 4 to 12 and in which other panel edges are joined together by clips 35 and poles 34 as shown in FIG. 16. Other members which can be fastened in the panel slots 13 can also be provided for use with the screen assembly. These members could, for example, be supporting members such as shelf brackets having foot portions which can be fastened in the slots 13 in a similar manner to the clips 35 of FIG. 17: an example of such a bracket is described in the above-mentioned British Patent Specification No. 2 126 309 and is also shown in the accompanying FIGS. 18 to 20. This bracket 40 is made in one piece of plastics material and comprises a main plate-like part 41 to which a foot portion 42 is connected by a neck 43. The foot portion 42 is substantially the same as the foot portion 36 of the clip 35 shown in FIG. 17. The bracket 40 also has a subsidiary plate-like part 44 held in spaced parallel relationship to the main part 41 by a plate-like bridge 45 and a bridge 46 of curved cross-section.

The bracket 40 is attached to a panel 1 of a screen assembly in the same manner as the clip 35 of FIG. 17, that is, the foot portion 42 of the bracket is inserted into the end of the slot 13 (FIG. 2) in one side of the panel and is slid along the slot to the desired location whereupon the bracket is rotated to clamp the foot portion in the slot. The orientation of the bracket in the clamped position is shown in FIGS. 19 and 20 which also show how a shelf support 47 having a recess 48 in one side can then be hung over the curved bridge 46 of the bracket.

It will be understood that, for supporting a shelf, a pair of brackets 40 would be used comprising a "right hand" and a "left hand" bracket for location on opposite side edges of a panel. The shelf would then be placed on top of the pair of supports 47 hung on the brackets. A bracket 40 such as that shown in FIG. 18 could, however, be used for other purposes, for example to mount a light or some other component on a screen assembly and could then be formed as an integral part of that component. It will also be understood that the bracket 40 of FIG. 18 can be used in a screen assembly in which the panels 1 are joined together exclusively by slide connecting members of the kind shown in FIGS. 2 and 4 to 12 and also in a screen assembly in which a combination of slide connecting members and poles with clips (FIG. 16) are used.

Figure 22:
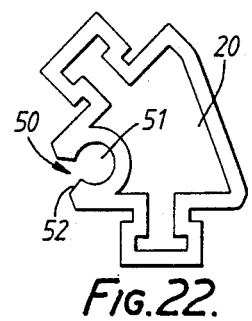
Figure 23:
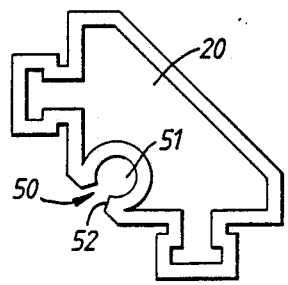

Alternatively, instead of using the slots 13 in the panels as mounting points for components such as shelf brackets, use can be made of longitudinal slots provided in the connecting members 2 between panels. Connecting members which incorporate such grooves are illustrated in FIGS. 21 to 23. Each of these connectors is an extruded component of hollow cylindrical construction similar to the connectors shown in FIGS. 10 and 11 and is provided, on the front portion 25 of the central body 20, with a longitudinally-extending slot 50 having a main part 51 of circular cross-section and an outwardly-flared entrance portion 52. The connecting members shown in FIGS. 21 to 23 will provide angles, between connected panels, of 180°, 135° and 90° respectively but, in each case, the mouth of the entrance portion 52 of the slot 50 will be accessible between the panels.

Fastening devices of the form shown at 53 in FIGS. 24 and 25 can be used for securing components (such as shelves) to a display system incorporating connecting members of the type shown in FIGS. 21 to 23. The fastening device 53 is shown in combination with the connecting member of FIG. 21 but could also be used with the connecting members of FIGS. 22 and 23.

The device 53 comprises two components 54, 55. The component 54 has a cylindrical part 56 and an externally-threaded part 57 which extends at right angles from the cylindrical part. The diameter of the cylindrical part 56 is such that this part can be inserted into one end of the main part 51 of the slot 50 in the connecting member and slid along the slot with the threaded part 57 projecting from the entrance portion 52. The component 55 is tubular and threaded internally so that it can be screwed on to the part 57 of component 54 and into engagement with the outer surface of the connecting member, to clamp the component 54 at any desired location along the length of the slot 50.

When the device 53 has been secured in position, a component such as a shelf support (not shown) can be screwed into the outer end of the part 55 of the device.

If the end of the slot 50 is inaccessible, the walls of the slot entrance 52 can be cut away as indicated at 58 to allow the cylindrical part 56 of component 54 to be inserted into the slot at a convenient point along the length of the latter.

It will be appreciated that, using vertical connector members of the type shown in FIG. 23, a display case similar to that shown in FIG. 13 can be constructed without the need for the "three-panel" connecting members 33: instead, shelf brackets are secured to the vertical connector members of the display case using fastening devices 53 as shown in FIG. 24 and are used to support the horizontal floor panel 27A.

What is claimed is:

1. A portable display system comprising a plurality of removable display panels arranged in adjacent edge to edge relation; at least one elongate connecting member disposed between and interconnecting adjacent panels, each of said adjacent panels including a frame member provided with an outwardly facing elongate slot having an enlarged interior portion and a narrow exterior entrance communicating therewith, the connecting member having a pair of relatively spaced slot-engaging protuberances having enlarged heads sized to slidably fit within corresponding slot interior portions and narrow neck segments slidably disposed within corresponding narrow entrances, and a body portion interconnecting said protuberances; at least one of the adjacent interconnected display panels including a fastening element having a foot portion securable in the frame member slot, and a supporting portion for mounting an external device on at least the one adjacent panel.

2. The portable display panel system of claim 1, in which the foot portion is securable in the slot by rotation of said fastening element.

3. Apparatus for constructing a portable display system, comprising a plurality of removable non-load bearing display panels each with a slot in at least one edge thereof, a plurality of elongate connecting members for connecting the panels together, each connecting member being positionable between adjacent panels and having at least two relatively spaced slot-engaging heads for insertion into the slots in the adjacent panels and connecting them together, a plurality of poles and a plurality of fastening elements, each of the latter having a foot portion fastenable in a slot in the adjacent panels and arcuate portions spaced from said foot portion and fastenable to the poles, whereby the adjacent panels are connectable together either by said elongate connecting members or said fastening elements and poles.

* * * * *